United States Patent [19]

Rees et al.

[11] 4,272,236
[45] Jun. 9, 1981

[54] INJECTION NOZZLE PROVIDED WITH SHUT-OFF MEANS

[75] Inventors: Herbert Rees, Willowdale; Robert D. Schad, Schomberg, both of Canada

[73] Assignee: Husky Injection Molding Systems Limited, Bolton, Canada

[21] Appl. No.: 103,425

[22] Filed: Dec. 14, 1979

[51] Int. Cl.³ .............................................. B29F 1/03
[52] U.S. Cl. ................................................... 425/564
[58] Field of Search ............... 425/563, 564, 565, 566, 425/DIG. 229

[56] References Cited

U.S. PATENT DOCUMENTS

| | | | |
|---|---|---|---|
| 3,488,810 | 1/1970 | Gellent | 425/563 |
| 3,491,408 | 1/1970 | Natkins | 425/563 |
| 3,806,295 | 4/1974 | Gellent | 425/563 |
| 3,941,540 | 3/1976 | Driscoll | 425/563 X |

FOREIGN PATENT DOCUMENTS 2816014  11/1978  Fed. Rep. of Germany ........... 425/564

Primary Examiner—Thomas P. Pavelko
Attorney, Agent, or Firm—Karl F. Ross

[57] ABSTRACT

A nozzle for the introduction of liquefied plastic material into a mold has a channel terminating at one end in an injection orifice and adjoining at its other end a reduced bore serving for the guidance of a valve pin slidable with all-around clearance in that channel, the pin having a rear extremity projecting from its guide bore. A passage for the admission of liquefied molding material under pressure enters the channel at its junction with the reduced guide bore, rearwardly of a set of skew fins of the pin serving for additional guidance thereof in the channel and for imparting relative rotary motion to the flow and the pin. The orifice is blocked at the end of an injection operation by a pusher acting upon the projecting rear extremity; it is unblocked, upon withdrawal of the pusher, by the pressure of the molding material in the channel upon a forwardly facing annular shoulder of the pin.

5 Claims, 2 Drawing Figures

INJECTION NOZZLE PROVIDED WITH SHUT-OFF MEANS

FIELD OF THE INVENTION

Our present invention relates to an apparatus, such as an injection-molding machine, wherein a mold cavity communicates with a source of liquefied plastic material via a nozzle provided with shut-off means for blocking the outflow of such material from an orifice of that nozzle when the cavity has been filled and before the mold is opened.

BACKGROUND OF THE INVENTION

The usual shut-off devices of the type referred to include plungers or pins which may be displaceable either transversely to the flow path or longitudinally thereof; see, for example, U.S. Pat. Nos. 4,073,944 and 4,076,485. Conventional mechanisms used for this purpose have the drawback that the channel carrying the plastic flow to the nozzle orifice has discontinuities forming dead-air pockets in which the plastic mass tends to accumulate and degrade while being bypassed by the mainstream of that mass. Some of these mechanisms, moreover, are rather complicated and require an enlarged nozzle body calling for extra heating energy to keep the mass fluid.

OBJECTS OF THE INVENTION

The general objects of our present invention, therefore, is to provide means in such an apparatus for selectively blocking and unblocking the flow of liquefied plastic material through an injection nozzle to a mold cavity with avoidance of the disadvantages referred to above.

A related object is to provide the nozzle with means for effectively sweeping out, during each injection operation, residual plastic material left over from the preceding cycle.

SUMMARY OF THE INVENTION

We realize these objects, pursuant to our present invention, by the provision of an enlongate valve member—referred to hereinafter as a pin—having a rear portion remote from the nozzle orifice slidably guided in a bore of the nozzle body for limited longitudinal displacement relative thereto, a front portion with a tip close to the orifice received in the flow channel of the nozzle with all-around clearance, and a forwardly facing shoulder preferably of annular shape. The rear portion co-operates with actuating means, such as a pusher adjoining a rear extremity of the pin, for forcing its tip into flow-blocking engagement with the nozzle orifice after the mold cavity has been filled with liquefied plastic material entering the channel through a passage in the nozzle merging with that channel at a junction thereof with the aforementioned guide bore. After the mold has been opened for removal of the molded article or articles, and upon deactivation of the actuating means following its reclosure, the heated plastic material introduced into the channel under pressure exerts a rearward force upon the shoulder of the pin, thereby unblocking the orifice to let some of that material enter the cavity.

The longitudinally slidable valve member, guided in an extension of the flow channel, allows that channel to define a straightforward flow path without dead corners or pockets. With the end of the bore remote from the flow channel open to the atmosphere, the pin encounters no significant resistance on its unblocking stroke.

Advantageously, according to another feature of our invention, the front portion of the pin is formed with peripherally spaced projections slidably bearing upon the inner channel wall for additional guidance. These projections are designed as fins skew to the pin axis for imparting a rotary motion to the flow to ensure a more effective sweep-out.

BRIEF DESCRIPTION OF THE DRAWING

The above and other features of our present invention will now be described in detail with reference to the accompanying drawing in which.

SPECIFIC DESCRIPTION

Figure 2:
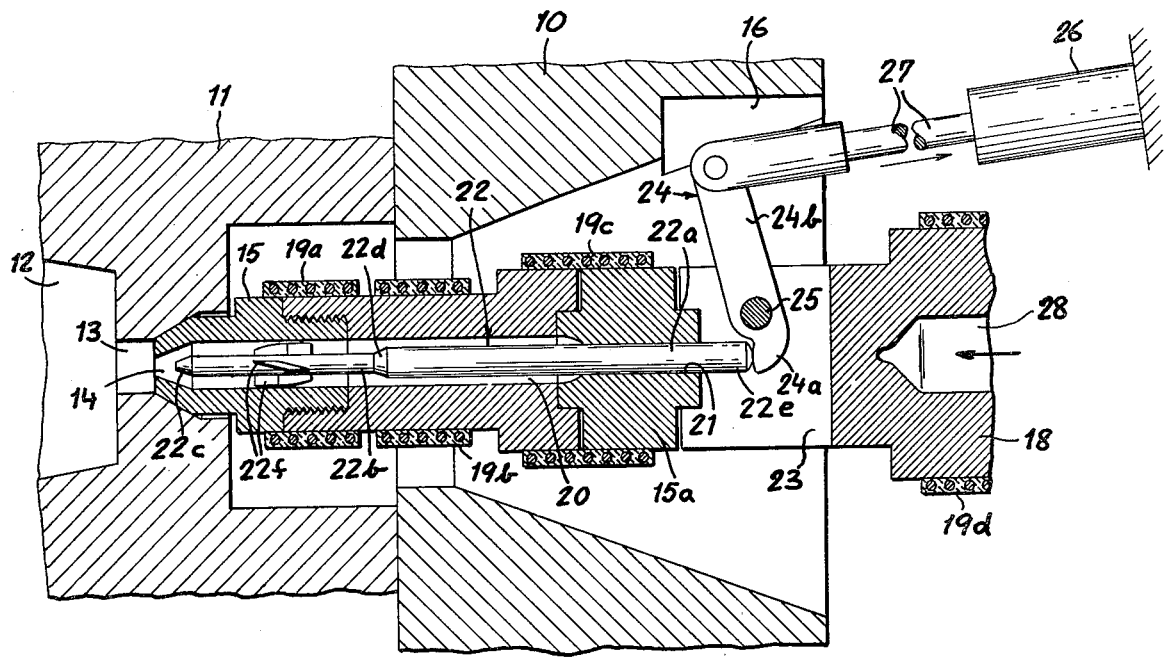
FIG. 2 is a sectional plan view taken on the line II—II of FIG. 1.
Figure 1:
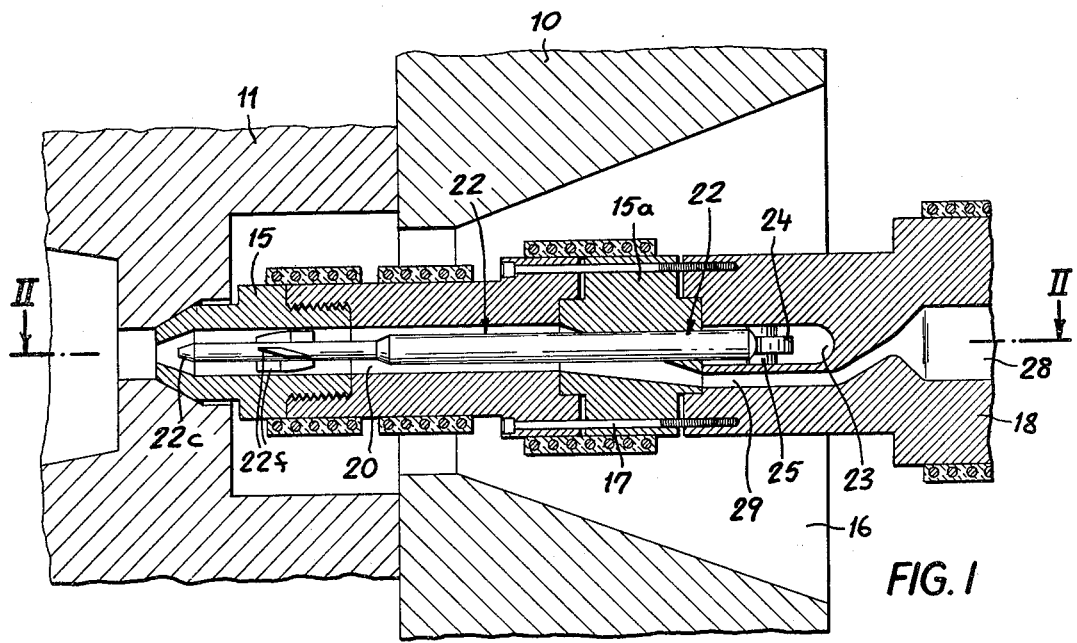
FIG. 1 is a sectional side view of part of a stationary platen and an adjoining mold portion of an injection-molding machine together with an injection nozzle provided with shut-off means according to our invention.

In the drawing we have shown only so much of an otherwise conventional injection-molding machine as is necessary for an understanding of our present invention. The machine comprises a stationary platen 10 carrying a mold portion 11 provided with a cavity 12; mold portion 11 coacts in the usual manner with a complementary mold portion on a nonillustrated movable platen for closing the cavity 12 during injection of liquefied plastic material and reopening the cavity thereafter to discharge the molded article. Cavity 12 has a sprue 13 communicating with an orifice 14 of an injection nozzle 15 seated against the mold portion 11. The body of nozzle 15 passes through an aperture 16 in platen 10 and is connected by bolts 17 with a duct 18 forming a rearward extension of the nozzle. Both the nozzle body and the duct 18 are surrounded by a number of heaters 19a, 19b, 19c, 19d to keep the oncoming plastic mass in a fluid state.

Orifice 14 constitutes the front end of an axially extending channel 20 which is of constant diameter between that orifice and a rear portion 15a of the nozzle body having a narrower bore 21 in line with channel 20. A valve pin 22 has a rear portion 22a of larger diameter, slidably guided in bore 21, and a front portion 22b of smaller diameter terminating in a tip 22c close to orifice 14. The two pin portions 22a and 22b are separated by an annular shoulder 22d. Rear portion 22a terminates in an extremity 22e which projects from bore 21 into a cutout 23 of duct 18 formed as a throughgoing transverse slot. A lever 24 pivoted in that slot on a stud 25 has a short arm 24a designed as a pusher coacting with extremity 22e to drive the pin 22 forward when the lever is swung clockwise about stud 25 (as viewed in FIG. 2) by a single-acting fluidic jack 26 which is linked with the longer arm 24b of the lever through a connecting rod 27. Upon being thus pushed forward, pin 22 blocks by its tip 22c the orifice 14 and with it the sprue 13 of cavity 12.

Duct 18 extends from a nonillustrated source of liquefied molding material under pressure, such as an injection chamber to which the plastic mass is supplied by a feed screw in a manner well known in the art, and forms a supply path 28 communicating with a passage 29 which merges from below into the axial channel 20 of nozzle 15 at the junction of that channel with guide bore 21. Thus, with the pin 22 retracted as shown, the plastic mass passes through the annular clearance between pin 22 and the nozzle body into orifice 14 and thence via sprue 13 into cavity 12. This flow path has no pocket-forming discontinuities and is but slightly obstructed by a set of fins 22f on pin portion 22b which are peripherally spaced apart and slidingly engage the surrounding channel wall for more positive guidance of pin 22. The fins 22f, as shown, lie skew to the pin axis and thus tend to impart a rotary component to the flow with respect to the surface of pin 22; the resulting relative rotation between the pin and the plastic flow effectively prevents the formation of dead-air spaces beyond the forward edges of the fins. In this connection it is immaterial whether the pin is held against rotation or is allowed to turn on its axis.

When the jack 26 is hydraulically or pneumatically pressurized to drive the pin 22 into its blocking position, the influx of plastic mass into cavity 12 is stopped. After the molded article has been ejected and the mold is reclosed, jack 26 is depressurized whereupon the pressure of the plastic mass in channel 20 acts upon shoulder 22d to force the pin 22 back into its illustrated unblocking position. Another injection cycle will then take place.

The nozzle 15 need not necessarily terminate at the cavity inlet but could be extended well into the cavity, if desired, with suitable lengthening of pin 22 to operate in the aforedescribed manner.

We claim:

1. In an apparatus provided with a mold having a cavity, a nozzle for injecting liquefied plastic material into said cavity in a closed position of said mold, said nozzle having a body with a channel terminating in an injection orifice open toward said cavity, and shut-off means for closing said orifice before the mold is opened, the improvement wherein said shut-off means comprises an elongate valve pin having a rear portion remote from said orifice slidably guided in a bore of said body adjoining said channel for limited longitudinal displacement relative thereto and a front portion with a tip close to said orifice received in said channel with all-around clearance, and actuating means co-operating with said rear portion for forcing said tip into flow-blocking engagement with said orifice, said body being formed with a passage for oncoming plastic material under pressure merging with said channel at the junction thereof with said bore, said valve pin being provided with a shoulder facing said tip for repression by an unblocking force exerted thereon by said plastic material to disengage said tip from said orifice upon deactivation of said actuating means whereby said plastic material is free to flow through said orifice into said cavity, said front portion being provided with a set of peripherally spaced fins skew to the axis of said valve pin, said fins slidably bearing upon an inner wall surface of said channel for imparting a relative rotary motion to the flow of plastic material traversing said orifice.

2. An apparatus as defined in claim 1 wherein said shoulder is annular and disposed rearwardly of said fins.

3. An apparatus as defined in claim 1 or 2 wherein said bore has an end remote from said channel open to the atmosphere.

4. An apparatus as defined in claim 3 wherein said body has a rearward extension formed with a conduit communicating with said passage and further formed with a cutout offset from said conduit accommodating an extremity of said rear portion projecting from said bore, said actuating means being lodged at least in part in said cutout.

5. An apparatus as defined in claim 4 wherein said actuating means comprises a pusher pivotally mounted in said cutout.

* * * * *